US006769448B1

(12) United States Patent
Williams

(10) Patent No.: US 6,769,448 B1
(45) Date of Patent: Aug. 3, 2004

(54) ACTUATING DEVICE

(75) Inventor: John Williams, Ashton-under-Lyne (GB)

(73) Assignee: Progressive Engineering (A-U-L) Ltd., Lancashire (GB)

( * ) Notice: Subject to any disclaimer, the term of this patent is extended or adjusted under 35 U.S.C. 154(b) by 0 days.

(21) Appl. No.: 10/110,437

(22) PCT Filed: Oct. 12, 2000

(86) PCT No.: PCT/GB00/03916

§ 371 (c)(1),
(2), (4) Date: Aug. 21, 2002

(87) PCT Pub. No.: WO01/27509

PCT Pub. Date: Apr. 19, 2001

(30) Foreign Application Priority Data

Oct. 12, 1999 (GB) .............................................. 9924073

(51) Int. Cl.$^7$ .............................................. F16K 17/38
(52) U.S. Cl. .............................. 137/75; 137/79; 251/74; 251/368
(58) Field of Search .......................... 137/72, 75, 77, 137/79; 251/74, 294, 368

(56) References Cited

U.S. PATENT DOCUMENTS

| 2,030,019 A | * | 2/1936 | Bard | 137/77 |
| 2,997,052 A | * | 8/1961 | Mangini | 137/77 |
| 4,099,551 A | * | 7/1978 | Billington et al. | 137/77 |
| 4,245,662 A | * | 1/1981 | McGee | 137/75 |
| 4,635,670 A | * | 1/1987 | Kilmoyer | 137/75 |
| 4,811,752 A | * | 3/1989 | Lyons et al. | 137/77 |
| 4,827,963 A | * | 5/1989 | Baker et al. | 137/75 |
| 4,887,630 A | * | 12/1989 | Hill | 137/72 |
| 5,275,194 A | * | 1/1994 | Gray, Jr. | 137/75 |
| 5,343,884 A | * | 9/1994 | Henderson et al. | 137/77 |

FOREIGN PATENT DOCUMENTS

BE 528227 * 5/1954

OTHER PUBLICATIONS

International Preliminary Examination Report on the corresponding PCT Application PCT/GB00/03916.*

* cited by examiner

*Primary Examiner*—Ramesh Krishnamurthy
(74) *Attorney, Agent, or Firm*—Conley Rose, P.C.

(57) ABSTRACT

A temperature dependent actuating device for a valve having a closure member which must be moved from a first to a second position to close the valve, the actuating device comprising a body, an actuating member supported by the body and moveable from a first non-actuating position to a second actuating position, a biasing device urging the actuating member toward the second position, and a temperature dependent device for releasably retaining the actuating member in the first position provided the temperature is below a predetermined level. The body is adapted to be mounted such that the actuating member is positioned to engage the valve closure member such that if the temperature in the vicinity of the valve rises above the predetermined temperature, the actuating member is released and moves to its second position, moving the valve closure member to its second position and closing the valve.

6 Claims, 4 Drawing Sheets

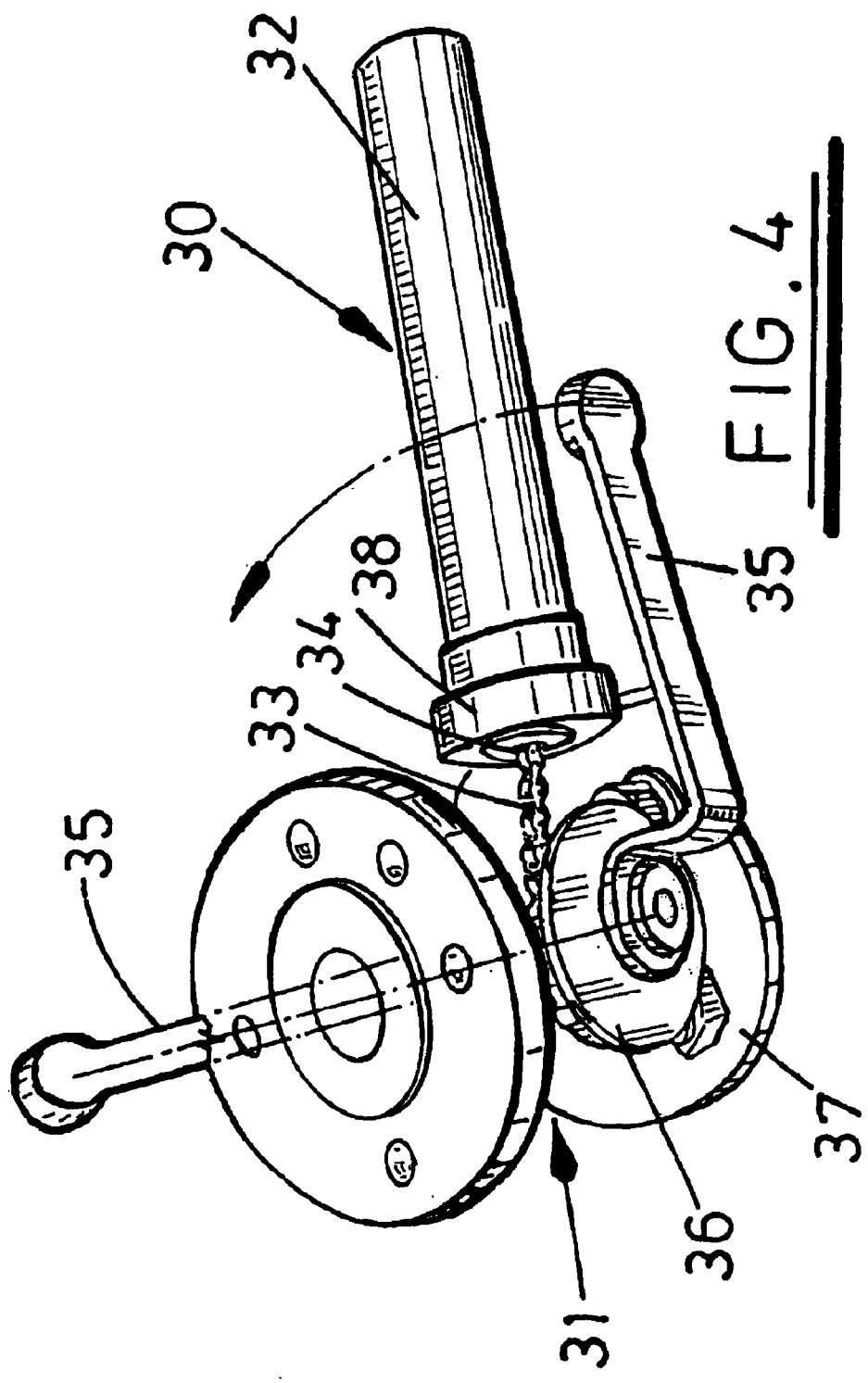

ACTUATING DEVICE

CROSS-REFERENCE TO RELATED APPLICATION

This application is claims benefit of PCT application Serial No. PCT/GB00/03916, filed 12 Oct. 2000, which is hereby incorporated herein by reference.

The present invention relates to a temperature dependent actuating device. Particularly, but not exclusively, the invention relates to a device for actuating the closure mechanism of a valve, and in particular a discharge valve as fitted to hazardous fluid containers such as a fuel tankers.

BACKGROUND OF THE INVENTION

There are many different situations in which safety concerns require that mechanisms must be provided for quickly shutting off a valve or the like in potentially dangerous circumstances. For instance, in relation to fuel tankers (including both road and rail tankers) it has long been a requirement to provide a mechanism for shutting off the valve from a remote position in the event of a leakage or similar accident. Conventionally this is done by fitting a boden cable to the operating lever of the valve, the cable extending around the periphery of the tanker so that the valve can be closed simply by pulling on the cable from any position around the tanker.

More recent safety regulations specify not only that it must be possible to manually close a fluid discharge valve from a remote position, but also that the valve must close automatically in the event of a fire. Clearly re-designing and replacing all existing discharge valves with valves designed to close in the event of a fire would be a massive and expensive operation. It is therefore an object of the present invention to obviate the need to re-design or replace conventional discharge valves.

SUMMARY OF THE INVENTION

According to a first aspect of the present invention there is provided a temperature dependent actuating device for a valve having a closure member which must be moved from a first to a second position to close the valve, the actuating device comprising a body, an actuating member supported by the body and moveable relative to the body from a first non-actuating position to a second actuating position, biasing means which urges the actuating member towards the second position, and temperature dependent means for releasably retaining the actuating member in said first position against the biasing action of the biasing means provided the temperature is below a predetermined level, wherein said body is adapted to be mounted adjacent the valve with said actuating member positioned to engage the valve closure member, such that if the temperature in the immediate vicinity of the valve rises above said predetermined temperature said actuating member is released from said first position and is biased to its second position thereby moving the valve closure member from its first to its second position and closing the valve.

The present invention thus provides an actuating device which may be retro-fitted to existing valve assemblies and which responds to temperatures in the immediate vicinity of the valve assembly to shut the valve in the event of the temperature rising to a dangerous level. The "predetermined temperature" may not be determined precisely, what is important is that the actuating member will be activated in the event of a dangerous situation such as a fire.

The body of the actuating device may have fixing means, such as flanges etc, designed to mate with flanges or the like of conventional valve assemblies. Alternatively, a separate bracket or clamp arrangement may be provided to mount the actuating device to the valve assembly.

Movement of the actuating member may either push or pull the operating mechanism into the closed position.

Suitably, when in said first position the actuating member is clear of the closure member but strikes the closure member when released into its second position thereby pushing the closure member into the closed position.

Alternatively, the actuating member is connected to the closure member via a linkage, the linkage being arranged to translate movement of the actuating member to movement of the valve closure member from its first position to its second position, thereby closing the valve.

Preferably, said biasing means comprises a coil spring which is under compression when said actuating member is held in said first position.

Suitably, the first position of the actuating member is a retracted position (relative to the body) and the second position is an extended position (relative to the body) and The temperature dependent release means preferably comprises a fusible material, such as a relatively low melting point metal or metal alloy (e.g. a solder). In preferred embodiments the fusible material is used to weld the actuating member in said first position relative to the body so that when the temperature rises above the predetermined temperature the weld melts and the actuating member is released.

According to a second aspect of the present invention there is provided a temperature dependent actuating device comprising a body, an actuating member supported by the body and moveable relative to the body from a first retracted position to a second actuating position in which it extends from the body, biasing means which urges the actuating member towards the second position, and means comprising a body of fusible material for releasably retaining the actuating member in said first position against the action of the biasing member, wherein said body of fusible material is selected to melt at a temperature above a predetermined temperature thereby releasing said actuating member.

Preferably when in said retracted position the actuating member is received entirely within the body. This need not necessarily be the case and a portion (or even all) of the actuating member may extend from the body when in said first position in which case the actuating member will extend further from said body when in said second position.

According to a third aspect of the present invention there is provided a valve assembly comprising a closure member which must be moved from a first to a second position to close a valve, and a actuating member positioned to engage the valve closure member, the actuating member being supported by a body and being moveable relative to the body from a first non-actuating position to a second actuating position, temperature dependent means being provided for releasably retaining the actuating member in said first position against the biasing action of a biasing means which urges the actuating member towards the second position, the arrangement being such that a rise in temperature in the immediate vicinity of the valve assembly above a predetermined temperature causes said retaining means to release the actuating member so that the actuating member is biased to its second position thereby moving the valve closure member from its first to its second position and closing said valve.

BRIEF DESCRIPTION OF THE DRAWINGS

Specific embodiments of the present invention will now be described, byway of example only, with reference to the accompanying drawings, in which:

FIGS. 3a, 3b and 3c are different views of a mounting bracket used to mount the actuating device to the valve assembly as illustrated in FIG. 1, FIG. 3b being a view looking in the direction of arrow B on FIG. 3a and FIG. 3c is a view looking in the direction of arrow C on FIG. 3a; and FIG. 4 illustrates a second actuating device according to the present invention, fitted to a conventional ball valve.

DETAILED DESCRIPTION OF THE PREFERRED EMBODIMENTS

Figure 1:
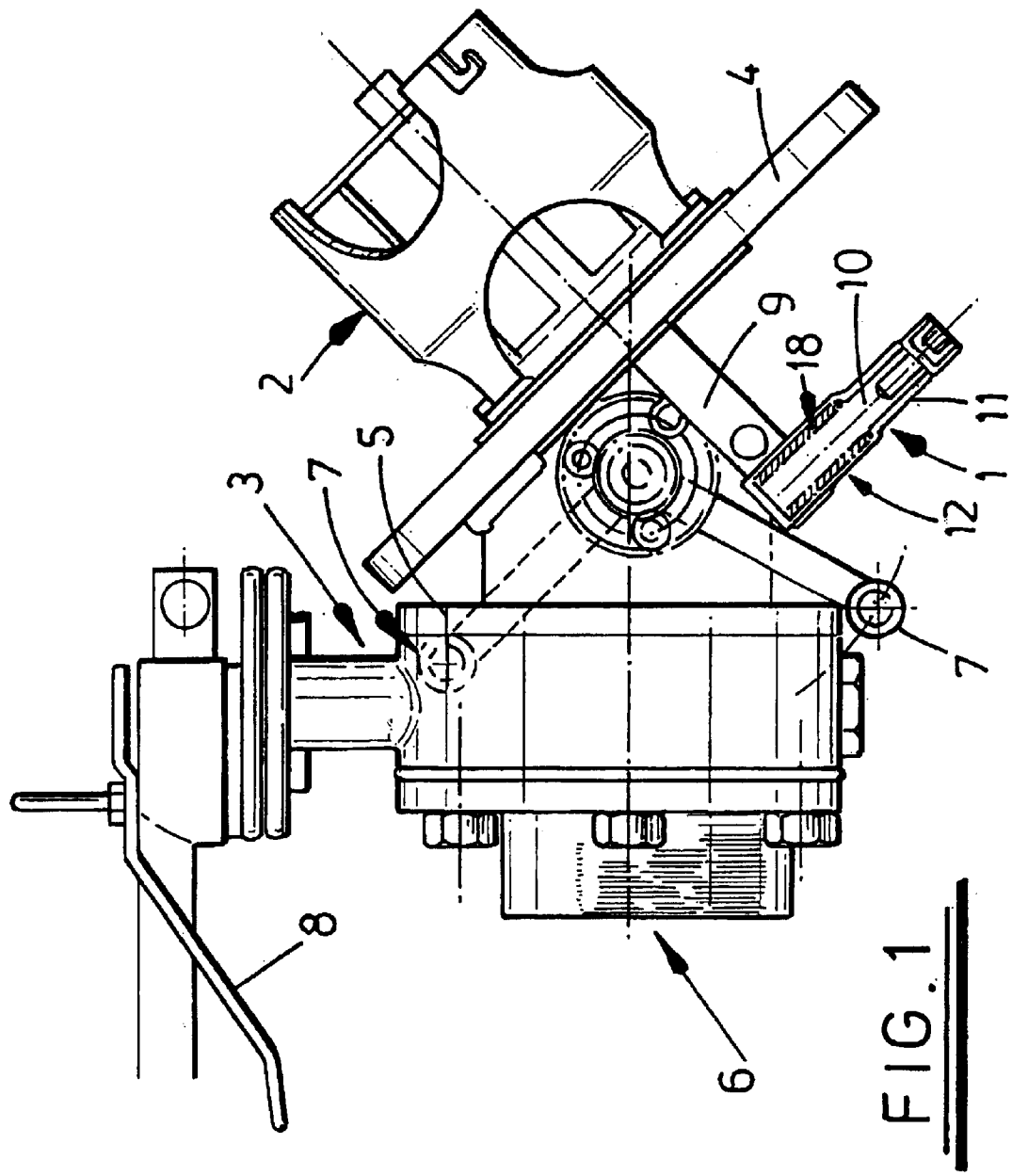
FIG. 1 illustrates an actuating device according to the present invention fitted to a conventional fuel tanker discharge valve assembly (the actuating device is shown in axial section)

Referring to FIG. 1, this illustrates a conventional fuel tanker discharge valve assembly retrofitted with an actuating device 1 according to the present invention. The discharge valve assembly comprises a primary discharge valve 2 and a secondary valve 3. The primary valve 1 includes a first mounting flange 4 provided to mount the valve assembly to a tanker (not shown). A second flange 5 provides a mounting for the secondary valve 3. A discharge hose 6 is then mounted to the body of the secondary valve 3. The primary and secondary valves 2 and 3 are operated via lever arms 7 and 8 respectively. Lever arm 7 is sprung with an over-centre mechanism such that levering the arm past a centre point in either direction causes the valve to either snap shut or snap open respectively (the closed position is shown with a dotted line). As mentioned above, the discharge valve assembly is entirely conventional and thus further details of its construction and operation will not be described.

Figure 3A:
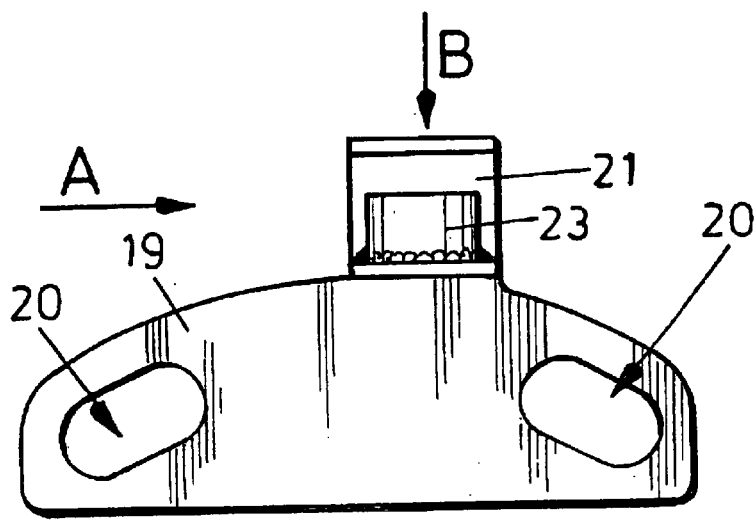
Figures 3B, 3C:
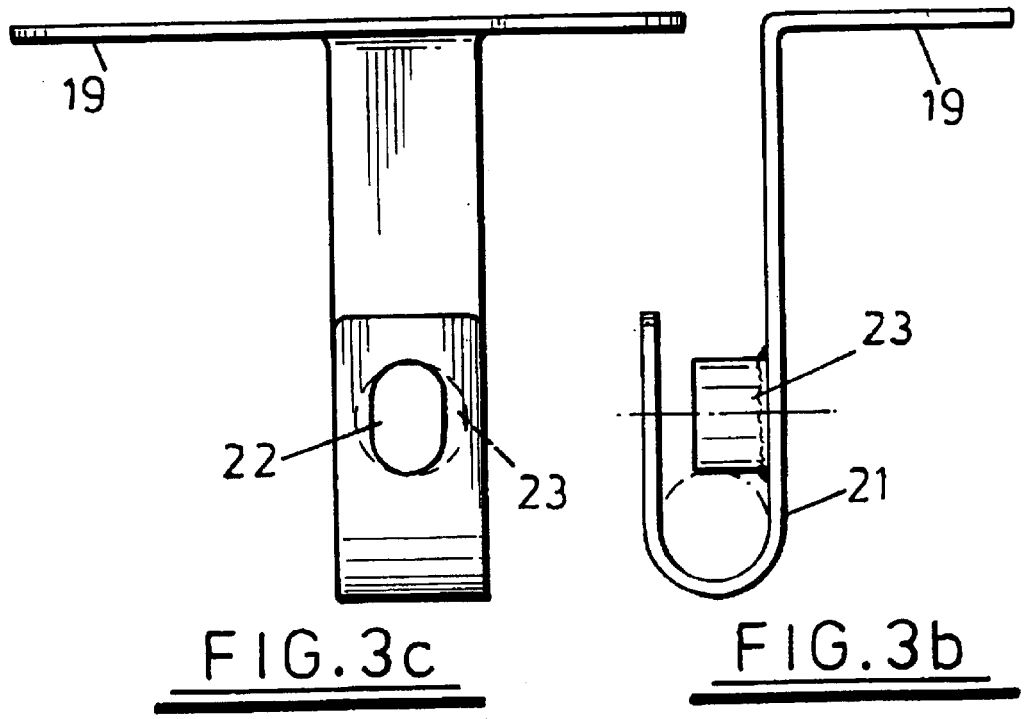

The actuating device 1 is mounted to the valve assembly mounting flange 4 using a bracket 9 (illustrated in detail in FIGS. 3a to 3c). The bracket 9 is part cut away in FIG. 1 to reveal details of the actuating device 1. The mounting bracket is described in more detail further below.

Figure 2:
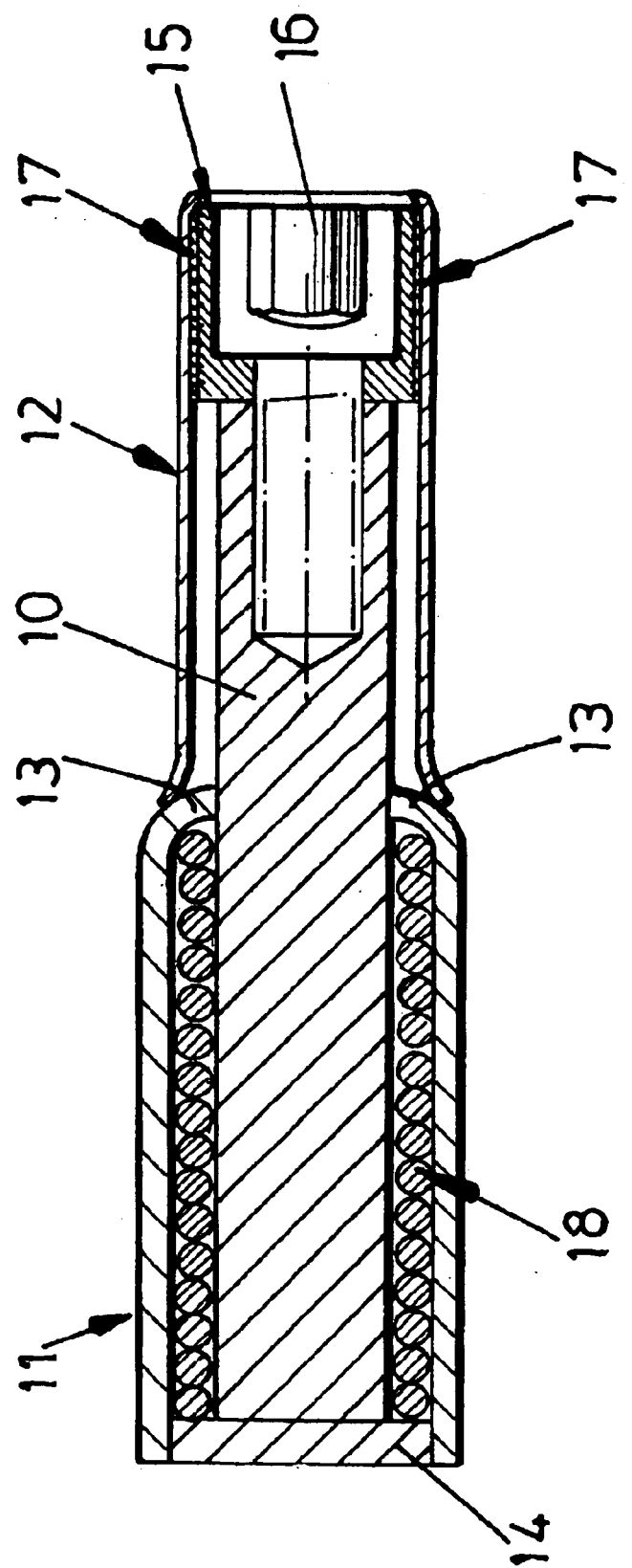
FIG. 2 is an enlarged view of the actuating device of FIG. 1, again shown in axial section.

Referring to FIGS. 1 and 2, the actuating device 1 comprises a plunger 10 housed within a two part tubular casing 11 and 12. The casing part 11 is open at one end and turned in at the other end to form an internal annular shoulder 13. This part is preferably made from a hard metal such as stainless steel. The casing part 12 is narrower in diameter than the part 11 and comprises a copper tube which abuts against the outside surface of the shoulder 13.

The plunger 10 extends through the copper tube 12 into the casing part 11 and has a radially extending annular flange 14 at its end adjacent the open end of the casing part 11. A brass bush 15 is secured to the opposite end of the plunger 10 via a set screw 16. The bush 15 is welded into the end of the copper tube 12 using a relatively low melting point metal alloy or solder 17. A helical spring 18 is located around the plunger 10 in the relatively wide part 11 of the casing and acts between the shoulder 13 and the flange 14 of the plunger 10 tending to bias the plunger 10 out of the casing. This motion is resisted by the copper tube 12 (which is welded to the bush 15) bearing against the outside surface of the annular shoulder 13.

Referring now to FIGS. 3a–3c, the mounting bracket X comprises a flange 19 provided with two apertures 20 which enables the bracket 9 to be bolted to the conventional valve assembly mounting flange 4. A hook portion 21 extends from the mounting flange 19 and provides a cradle to receive the steel part 11 of the casing. The hook portion 21 is provided with an aperture 22 and boss 23 to receive a bolt (not shown) to clamp the actuating device 1 in position as shown in FIG. 1.

From FIG. 1 it will be seen that in normal circumstances the plunger 10 will be clear of the handle in 7 and so will not impede normal operation of the valve assembly (and in addition will not impede operation of a conventional boden cable (not shown) to provide remote closure of the valve). However, in the event of a fire in the immediate vicinity of the valve 2 the low melting point metal 17 will melt releasing the plunger 10 to be driven forward by the spring 18. The copper tube 12 and brass bush 15 ensure good heat conduction to the weld 17.

As the plunger 10 is driven forward it strikes the handle 7 of the primary valve 2 moving it into the closed position (only a small amount of travel in the plunger 10 is required since it operates on the valve lever relatively close to its pivot point and furthermore since the over-centre mechanism means that the lever 7 only has to be driven marginally past the centre position for it to snap shut). The extent of travel of the plunger 10 is limited to the distance between the brass bush 15 and the annular shoulder 13 which prevents the plunger 10 from being ejected from the casing which might itself present a hazard.

Once the actuating device has been activated, it is not necessary to replace the entire device. Rather, the original bush 15 can simply be removed and a new tube 12 with a bush pre-welded therein positioned on the end of the casing part 11 so that the plunger 10 can be depressed back into the casing and screwed to the new bush.

The present invention therefore provides a relatively simply (and thus reliable) mechanical mechanism which operates to shut the valve 2 in response to a rise in temperature in the locality of the valve.

A second actuating device according to the invention is illustrated in FIG. 4. The actuating device 30 is attached to a ball valve 31 of the type fitted to liquid petroleum gas (LPG) tanks, and is arranged to automatically move the ball valve 31 to a closed configuration when the temperature in the vicinity of the ball valve 31 rises above a predetermined level.

The actuating device 30 operates in the same manner as the first actuating device described in relation to FIGS. 1 to 3. A cylindrical copper tube 32 contains a plunger (not visible in FIG. 4) which is biased by a helical spring towards an outer end of the tube 32. The plunger is welded to the tube 32 using a relatively low melting point metal alloy or solder. The weld restrains the plunger from moving in accordance with the bias of the coiled spring. A chain 33 is fixed to an inner end of the plunger, and is guided via an opening 34 out of an inner end of the tube 32.

The actuating device 30 is fitted to the ball valve 31 by a bracket 37 which is provided at one end with a cylindrical opening 38 to receive the tube 32, and is provided at an opposite end with a flat plate which is bolted to a flange 39 of the ball valve 31.

The valve is provided with a lever arm 35 for moving the ball valve 31 between open and closed configurations. The lever arm 35 actuates the ball valve 31 via a shaft (not visible in FIG. 4). The ball valve 31 is in the closed position in FIG. 4, with the open position represented by a section of the lever arm 35).

A plate 36 having a generally semicircular shape is fitted to the shaft which actuates the ball valve 31. The connection to the shaft is rigid such that the plate 36 and shaft are constrained to rotate together. An inner end of the chain 33 is fixed to an outer surface of the plate 36 by passing a pin of the chain through an eyehole provided in the plate 36.

The chain 33 is sufficiently long that, prior to actuation of the device 30, the lever arm 35 may be moved unimpeded between open and closed positions.

When the temperature of the actuating device rises to a predetermined level, the weld melts and the plunger is driven towards the outer end of the tube 32 by the coiled spring. The plunger draws the chain 33 into the tube 32, thereby rotating the plate 36 and moving the ball valve 31 to the closed configuration. The plunger is restrained from leaving the tube 32 by the chain 33.

The actuating device shown in FIG. 4 has been actuated, and the chain 33 is therefore drawn into the tube 32. As mentioned above, prior to actuation the length of chain 33 extending from the tube 32 is sufficient to allow the lever arm 35 to be moved unimpeded between open and closed positions.

The actuating devices may be fitted as simple retro-fit to conventional valve assemblies and alternative brackets may be provided to enable the devices to be readily fitted to valves different from that illustrated thereby avoiding the requirement to redesign the actuating devices themselves.

It will be appreciated that many modifications could be made to the detail of the illustrated actuating devices. For instance, the fusible material used to hold the plunger in position against the action of a spring need not form a weld between the plunger and the body (or vice versa) but could be in the form of a projection from the plunger which engages the body preventing the plunger from moving until the projection melts. Alternatively, the fusible material may be provided as a key which locates in an aperture or the like in both of the casing and the plunger locking the two together until the material melts. Other possible variations will be apparent to the skilled person. It will also be appreciated that any suitable fusible material may be used, the only requirement being that the material melts above a predetermined acceptable "safe" temperature.

The casing need not necessarily be a two-part casing as illustrated but could, for instance, comprise a single body.

In the illustrated examples the plunger is driven from the casing by a spring under compression. It will be appreciated that modifications in which, for instance, a spring in extension acts on the plunger can readily be devised. However, use of a spring in compression allows the size of the actuating device to be minimised. In other possible arrangements the spring may act to withdraw the plunger which may be attached to the valve assembly lever in such a way as to pull the lever into a closed position rather than to push it.

Although the actuating member according to the present invention has been designed for a particular application, it will be appreciated that the device may have application in other situations to automatically operate a mechanical lever, or switch etc, in the event of a fire or unacceptable rise in temperature.

Other possible modifications will be readily apparent to the appropriately skilled person.

What is claimed is:

1. A temperature dependent actuating device for a valve having a closure member which must be moved from a first to a second position to close the valve, the actuating device comprising:

a body;

an actuating member supported by the body and movable relative to the body from a first non-actuating position to a second actuating position;

biasing means which urges the actuating member towards the second position; and temperature dependent means for releasably retaining the actuating member in said first position against the biasing action of the biasing member provided the temperature is below a predetermined level, wherein said body is adapted to be mounted adjacent the valve with said actuating member positioned to engage the valve closure member, such that if the temperature in the immediate vicinity of the valve rises above said predetermined temperature said actuating member is released from said first position and is biased to its second position thereby moving the valve closure member from its first to its second position and closing the valve;

wherein when said first position the actuating member is spaced from the closure member of the valve and when moving from said position to said second position the actuating member impinges on the closure member of the valve thereby driving the closure member from its first position to its second position;

wherein the actuating member extends from the body when moving from its first to its second position, thereby pushing the valve closure member from its first to its second position;

wherein the body is a tubular casing, the actuating member comprises a rigid plunger slidable within said casing, the release means comprises a fusible metal which forms a weld between the plunger and the tubular casing, the biasing means is a helical spring disposed with the casing and around the plunger, the spring acts between an annular flange provided on said plunger and an internal annular shoulder of the casing;

wherein the tubular casing gas a first end defined by a first position thereof and a second end defined by a second position thereof, said plunger extending between said first and second positions of the tubular casing when in said first position, the coil spring being disposed within said first portion of the casing and the fusible material being provided within said second position of the casing; and wherein said first portion of the casing and said second portion of the casing are made from different materials, said second portion having a higher thermal conductivity than said first portion to provide good conduction of heat to said fusible material.

2. An actuating device according to claim 1, wherein the fusible material forms a weld between said second portion of the casing and a bush which is removably attached to one end of the plunger.

3. An actuating device according to claim 2, wherein the bush has an enlarged width relative to the width of the plunger and wherein an internal shoulder is provided by the casing to provide a stop for the plunger limiting the extended movement of the plunger in moving from its first to its second position.

4. An actuating device according to claim 3, wherein said shoulder is provided by an end of said first portion of the casing.

5. An actuating device according to claim 2, wherein said bush is secured to the plunger by a bolt or the like which passes through the bush axially into an end of the plunger.

6. A temperature dependent actuating device for a valve having a closure member which must be moved from a first to a second position to close the valve, the actuating device comprising:

a body;

an actuating member supported by the body and movable relative to the body from a first non-actuating position to a second actuating position;

biasing means which urges the actuating member towards the second position; and temperature dependent means for releasably retaining the actuating member in said first position against the biasing action of the biasing member provided the temperature is below a predetermined level, wherein said body is adapted to be mounted adjacent the valve with said actuating member positioned to engage the valve closure member, such that if the temperature in the immediate vicinity of the valve rises above said predetermined temperature said actuating member is released from said first position and is biased to its second position thereby moving the valve closure member from its first to its second position and closing the valve;

wherein when in said first position the actuating member is spaced from the closure member of the valve and when moving from said first position to said second position the actuating member impinges on the closure member of the valve thereby driving the closure member from its first position to its second position;

wherein the actuating member extends from the body when moving from its first to its second position, thereby pushing the valve closure member from its first to its second position;

wherein the body is a tubular casing, the actuating member comprises a rigid plunger slidable within said casing, the release means comprises a fusible metal which forms a weld between the plunger and the tubular casing, the biasing means is a helical spring disposed with the casing and around the plunger, and the spring acts between an annular flange provided on said plunger and an internal annular shoulder of the casing;

wherein the tubular casing has a first end defined by a first portion thereof and a second end defined by a second portion thereof, said plunger extending between said first and second portions of the tubular casing when in said first position, the coil spring being disposed within said first portion of the casing and the fusible material being provided within said second portion of the casing; and wherein said second portion of the casing is a copper tube.

* * * * *